US012723456B2

(12) United States Patent
Berres et al.

(10) Patent No.: US 12,723,456 B2
(45) Date of Patent: Sep. 1, 2026

(54) SETTING-OPEN DEVICE

(71) Applicant: Kiekert Aktiengesellschaft, Heiligenhaus (DE)

(72) Inventors: Michael Berres, Cologne (DE); Bernhard Drost, Isselburg (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/099,896

(22) PCT Filed: Jul. 21, 2023

(86) PCT No.: PCT/EP2023/070330
§ 371 (c)(1),
(2) Date: Jan. 30, 2025

(87) PCT Pub. No.: WO2024/033059
PCT Pub. Date: Feb. 15, 2024

(65) Prior Publication Data

US 2026/0035980 A1 Feb. 5, 2026

(30) Foreign Application Priority Data

Aug. 8, 2022 (DE) ..................... 10 2022 119 852.9

(51) Int. Cl.
*E05F 15/616* (2015.01)
*E05B 81/20* (2014.01)

(52) U.S. Cl.
CPC ............ *E05F 15/616* (2015.01); *E05B 81/20* (2013.01); *E05Y 2201/426* (2013.01); *E05Y 2900/531* (2013.01)

(58) Field of Classification Search
CPC ..... E05F 15/616; E05F 15/619; E05F 15/622; E05F 15/611; E05F 15/603; E05Y 2201/426; E05Y 2900/531
See application file for complete search history.

(56) References Cited

U.S. PATENT DOCUMENTS 9,995,066 B1 * 6/2018 Ottolini ................. E05F 15/619
11,697,952 B2 * 7/2023 Ottino ..................... E05F 1/105
49/139
(Continued)

FOREIGN PATENT DOCUMENTS

DE 102011015669 A1 10/2012
DE 102015103826 A1 9/2016
(Continued)

OTHER PUBLICATIONS

International Search Report mailed Oct. 17, 2023, for International Application No. PCT/EP2023/070330.

*Primary Examiner* — Justin B Rephann
(74) *Attorney, Agent, or Firm* — Renner, Otto, Boisselle & Sklar, LLP

(57) ABSTRACT

The invention relates to a setting-open device for a motor vehicle door, in particular a handleless motor vehicle door, for example a handleless motor vehicle side door. For this purpose, the setting-open device is equipped with an electric-motor drive (1 to 4) and with an associated actuating element (5) for acting on a door leaf. The actuating element (5) acts on the door leaf with a travel-dependent force along the actuation travel(S) of said actuating element. The electric-motor drive (1 to 4) acts on the actuating element (5) by the interposition of a lever mechanism (7, 8), wherein the lever mechanism (7, 8) acts on the actuating element (5) by way of at least a short lever (7) and a long lever (8).

12 Claims, 4 Drawing Sheets

(56) References Cited

U.S. PATENT DOCUMENTS

| | | | | |
|---|---|---|---|---|
| 11,814,891 | B2 * | 11/2023 | Cumbo | E05B 81/06 |
| 12,024,937 | B2 * | 7/2024 | Reddmann | E05F 15/616 |
| 12,116,821 | B2 * | 10/2024 | Yong | E05F 15/619 |
| 12,129,704 | B2 * | 10/2024 | Reddmann | E05F 15/616 |
| 2019/0203508 | A1 * | 7/2019 | Harajli | E05F 15/616 |
| 2019/0292818 | A1 * | 9/2019 | Cumbo | E05B 81/77 |
| 2020/0131836 | A1 * | 4/2020 | Ottino | E05F 1/105 |
| 2020/0263459 | A1 * | 8/2020 | Debroucke | E05B 81/20 |
| 2020/0270928 | A1 * | 8/2020 | Cumbo | E05F 15/611 |
| 2020/0284068 | A1 * | 9/2020 | Cumbo | E05B 81/20 |
| 2022/0074245 | A1 * | 3/2022 | Konrad | E05F 15/611 |
| 2022/0213722 | A1 * | 7/2022 | Linden | E05B 85/10 |
| 2023/0272659 | A1 * | 8/2023 | Reddmann | E05F 15/616<br>49/31 |
| 2024/0026723 | A1 * | 1/2024 | Reddmann | E05F 15/616 |
| 2025/0003263 | A1 * | 1/2025 | Klocke | E05B 81/70 |
| 2025/0059804 | A1 * | 2/2025 | Reddmann | E05B 81/20 |
| 2025/0320760 | A1 * | 10/2025 | Braden | E05F 15/616 |

FOREIGN PATENT DOCUMENTS

| | | | | |
|---|---|---|---|---|
| DE | 102018132665 | A1 | 6/2020 | |
| DE | 102020122254 | A1 | 3/2022 | |
| DE | 102021131149 | A1 | 6/2023 | |
| FR | 2814771 | A1 | 4/2002 | |
| WO | WO-2022149673 | A1 * | 7/2022 | E05F 11/54 |

* cited by examiner

SETTING-OPEN DEVICE

This application is a national phase of International Application No. PCT/EP2023/070330 filed Jul. 21, 2023, which claims priority to German Application No. 10 2022 119 852.9 filed Aug. 8, 2022, each of which is hereby incorporated herein by reference in its entirety.

DESCRIPTION

Field of Disclosure

The invention relates to a setting-open device for a motor vehicle door, in particular a handleless motor vehicle door, such as a handleless motor vehicle side door, with an electric-motor drive, and with an associated actuating element for acting on a door leaf, wherein the actuating element acts on the door leaf with a travel-dependent force along the actuation travel of said actuating element. This means that the electric-motor drive works on the associated actuating element, which the aid of which the door leaf is acted upon.

BACKGROUND OF DISCLOSURE

Setting-open devices for motor vehicle doors are known in a wide variety of designs, throughout the existing art and in practice. In fact, according to the explanations in DE 10 2015 103 826 A1, the setting-open device in question ensures that, with its help, the corresponding door leaf of the motor vehicle door in question can be opened at least partially relative to a motor vehicle body. As a result, it is then possible for an operator or user of the motor vehicle to grasp the door leaf through the gap thus created, and thereby to pivot and open the door leaf about its pivot axle in the example case.

In principle, of course, not only pivoting vehicle side doors can be equipped with such a setting-open device, but there is also the option of alternatively opening a tailgate, a sliding door, etc. in this way. Alternatively, a front hood can also be equipped with such a setting-open device.

In any case, in the case of a motor vehicle door equipped with the setting-open device in question, an external door handle or exterior handle is generally not necessary and the motor vehicle door can be designed to be particularly aerodynamically advantageous.

For this purpose, different embodiments of such setting-open devices are known in the prior art. For example, FR 2 814 771 A1 shows a setting-open device which, in the manner of a spindle drive, acts on a rod-shaped actuating element which can in this way open and, optionally, close a door leaf in the desired manner.

In another embodiment according to DE 10 2018 132 665 A1, the procedure is such that the door leaf can be held by means of the actuating element or actuating means. For this purpose, the actuating element has a locking means or a locking lever. This allows a positive connection to the vehicle body to be provided.

In the generic state of the art according to DE 10 2011 015 669 A1 a lifting element is provided which, using a motor drive, moves the motor vehicle door or the associated door leaf into the lifted position by means of a pivoting movement. For this purpose, the lifting element is made up of two parts: an outer lever and an inner lever, which can be pivoted relative to each other. Since the external lever is equipped for example with an arcuate stop collar with which it moves against the door leaf in order to open it, the travel-dependent force along the actuation travel of the actuating element, by which the actuating element acts on the door leaf, is observed.

The prior art has proven itself in principle, but still offers room for improvement. In fact, the structure of the generic teaching according to DE 10 2011 015 669 A1 is relatively complex and the frictional contact of the stop collar of the external lever on the inside of a flap or motor vehicle door at this point leads on the one hand to damage on the inside of the motor vehicle door, and on the other hand to increased abrasion on the stop collar. In addition, the interaction between the arcuate stop collar on the one hand and the door leaf acted upon by it on the other hand takes up a relatively large amount of space for mutual interaction. This is counterproductive in view of the fact that the installation space between the associated motor vehicle door and the motor vehicle body is usually limited because the interior of the motor vehicle door, which usually accommodates the electric-motor drive, is typically filled with other components, such as side impact protection, window lifters, loudspeakers, side airbags, etc.

SUMMARY OF DISCLOSURE

Accordingly, the present invention is based on the technical problem of further developing such a setting-open device for a motor vehicle door in such a way that a functionally appropriate and structurally simple application of force to the actuating element is achieved.

To solve this technical problem, a generic setting-open device for a motor vehicle door is characterized in the context of the invention in that the electric-motor drive acts on the actuating element with the interposition of a lever mechanism, wherein the lever mechanism works on the actuating element with at least a short lever and a long lever.

The design is usually such that the short lever acts on an end pin of the actuating element. In contrast, the long lever as a component of the lever mechanism usually interacts with a cantilever of the actuating element. In addition to the short lever and the long lever, it is of course possible and within the scope of the invention to additionally provide a further third or even fourth lever in order to actuate the actuating element for setting open the door leaf of the motor vehicle door with the aid of all the levers. The different levers easily ensure that the actuating element applies a travel-dependent force to the door leaf along the actuation travel of said actuating element, as explained in more detail below.

In fact, the design is usually such that the two levers act on the actuating element successively, i.e. one after the other. The procedure is usually such that, starting from an end position of the actuating element, the actuating element is first acted on by the short lever and then by the long lever. In this way, using the short lever the actuating element is subjected to a large force, usually over a short portion of the actuation travel. Starting from the end position of the actuating element, in this way the invention can ensure that the setting-open device is also able to open a motor vehicle door, or its door leaf, that is for example frozen to the motor vehicle body. This usually requires increased force, which according to the invention is provided by the short lever. This short lever works on the actuating element starting from its end position for a small part of its actuation travel. For example, a portion of 10% up to a maximum of 30% of the travel of the actuating element can be accomplished using the short lever.

If, however, the door leaf in the example described is free or has come loose from a circumferential rubber seal in the vehicle body, a lower force is then sufficient to act on the actuating element over the remainder of its actuation travel. In the example case described, this corresponds to a remaining actuation travel of 70% to 90% of the total actuation travel. That is, the actuating element is usually initially acted on, namely by the short lever, with a high gear ratio and thus a high force, starting from its end position in which it is retracted relative to a housing, taking into account a small portion of the actuation travel. Subsequently, the majority of the actuation travel of the actuating element is accomplished by the long lever acting on the actuating element with a lower gear ratio and consequently also a lower force.

As a result, the door leaf is acted upon by the short lever with high force and low speed along a first part of the actuation travel, whereas the long lever then completes the majority of the remainder of the travel of the actuating element with low force, and in the process the speed of the actuating element and thus also of the door leaf acted on by it also increases overall. This explains the high gear ratio observed starting from the end position in the first part of the actuation travel and then the lower gear ratio when the actuating element is acted on by the long lever.

In this context, the end position of the actuating element typically corresponds to a retracted position relative to an outer door skin of the door leaf or relative to the housing accommodating the device. In contrast, the fully extended position of the actuating element corresponds to its exposed position relative to the outer skin of the door leaf, and corresponds to the maximum distance of the door leaf from the vehicle body achieved by means of the setting-open device.

According to a further advantageous embodiment, both levers are connected to a gear wheel of the electric-motor drive on the same axle. This is usually done in such a way that both levers have an angular distance of approx. 20° to 40° from each other in relation to the common axis. The gear wheel generally belongs to a transmission and in particular to a reduction gear mechanism. The reduction gear mechanism is actuated by an electric motor of the electric-motor drive. The output side gear wheel of the gearbox in question is equipped with the two levers.

In addition, the design is usually such that the actuating element is designed as a linearly movable actuating slide. For this purpose, the actuating slide usually has at least two stop contours for interaction with an associated stop edge of the corresponding lever. This means that the actuating slide has a first stop contour for interacting with the stop edge on the short lever and a further, second stop contour which is set up and designed for interacting with the stop edge on the long lever.

The two stop contours are spaced apart from each other in the longitudinal direction with respect to the elongated and linearly movable actuating slide, so that first the short lever can act on the first stop contour and then the long lever can act on the second stop contour of the actuating slide. The first hinged door represents the end pin, while the second hinged door is designed as a cantilever.

The actuating slide or actuating element is usually made of plastic, as is the gear wheel with the two levers. The same may apply to the gear wheels of the transmission following the electric motor and in particular the reduction gear mechanism. Of course, other embodiments are also conceivable. In addition, the linearly movable actuating slide is usually assigned a linear guide.

The linear guide is generally located inside the housing that encloses the setting-open device as a whole. This means that the housing generally accommodates the electric-motor drive, including the gear mechanism and lever mechanism, in its interior, and is equipped with an opening only at the front through which the actuating element, designed as an actuating slide, extends outward or is moved back to its end position. The entire setting-open device, including the housing, can be attached inside the corresponding vehicle door equipped therewith. Due to the enclosed and sealed design of the housing, the entire setting-open device can be installed in a wet space inside the vehicle door without fear of functional impairment, even over long periods of time.

In conjunction with the compact and functional design achieved in this way, a force application adapted to the specific requirements is still provided. In fact, the actuating element initially works with increased force on the door leaf starting from its retracted end position in order to release or free the door leaf from the body, for example if the vehicle door is frozen shut by ice. As soon as the door leaf is free, it is acted upon by the actuating element with increased speed and reduced force over the remainder of its actuation travel. That is, over the actuation travel of the actuating element, the flow of force from the electric-motor drive or the output-side gear wheel changes, first from the short lever to the actuating element and then from the long lever to the actuating element, the two levers alternating and acting on the actuating element successively, i.e. one after the other. The two components of the actuation travel, which are completed using the short lever and the long lever, merge directly into one another or are connected directly to one another, so that the actuating element, as a whole and at its output side, is moved smoothly from its end position, initially with low speed and high force and then with low force and high speed. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
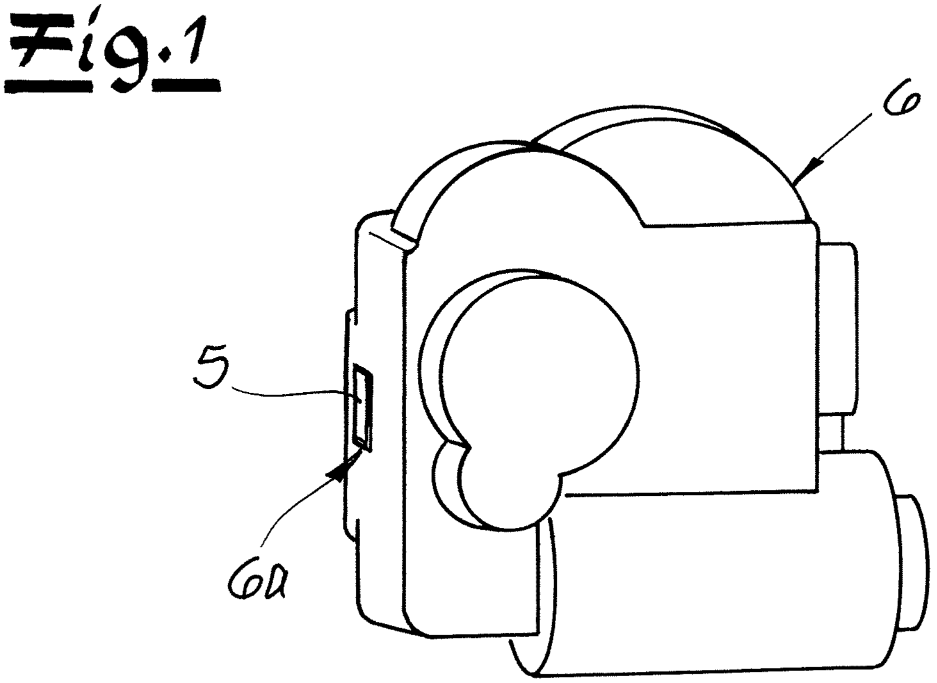
FIG. 1 shows the setting-open device according to the invention in various functional positions.
Figure 1:
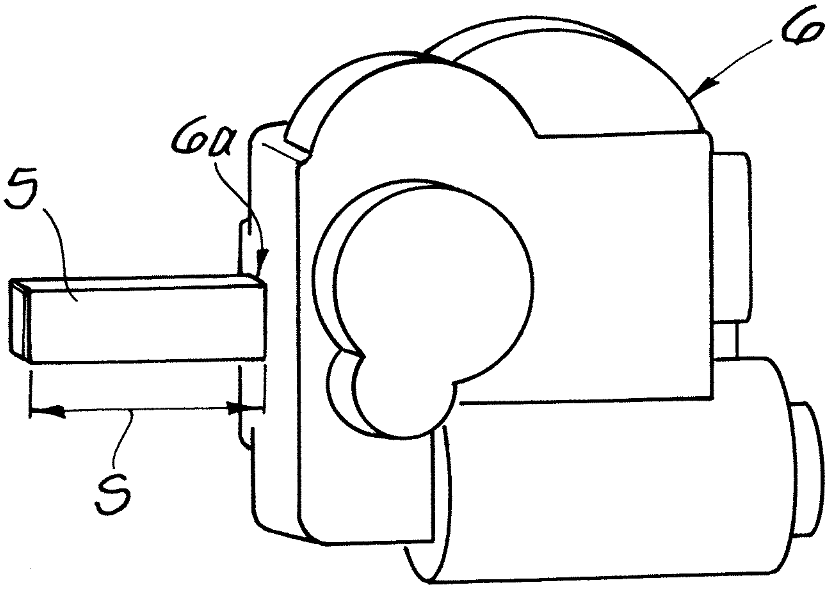

In FIG. 1, a setting-open device for a motor vehicle door (not expressly shown) is shown. In fact, the setting-open device shown in the drawing in FIG. 1 is usually accommodated inside a motor vehicle door and ensures, for example by its end-side attachment in the region of a pivot axle of the associated door leaf relative to a motor vehicle body, that the door leaf is set open by a certain amount relative to the motor vehicle body, as can be seen for example in FIG. 1 of DE 10 2015 103 826 A1. An operator can therefore grasp the door leaf through the gap and swing it open completely.

Figure 2:
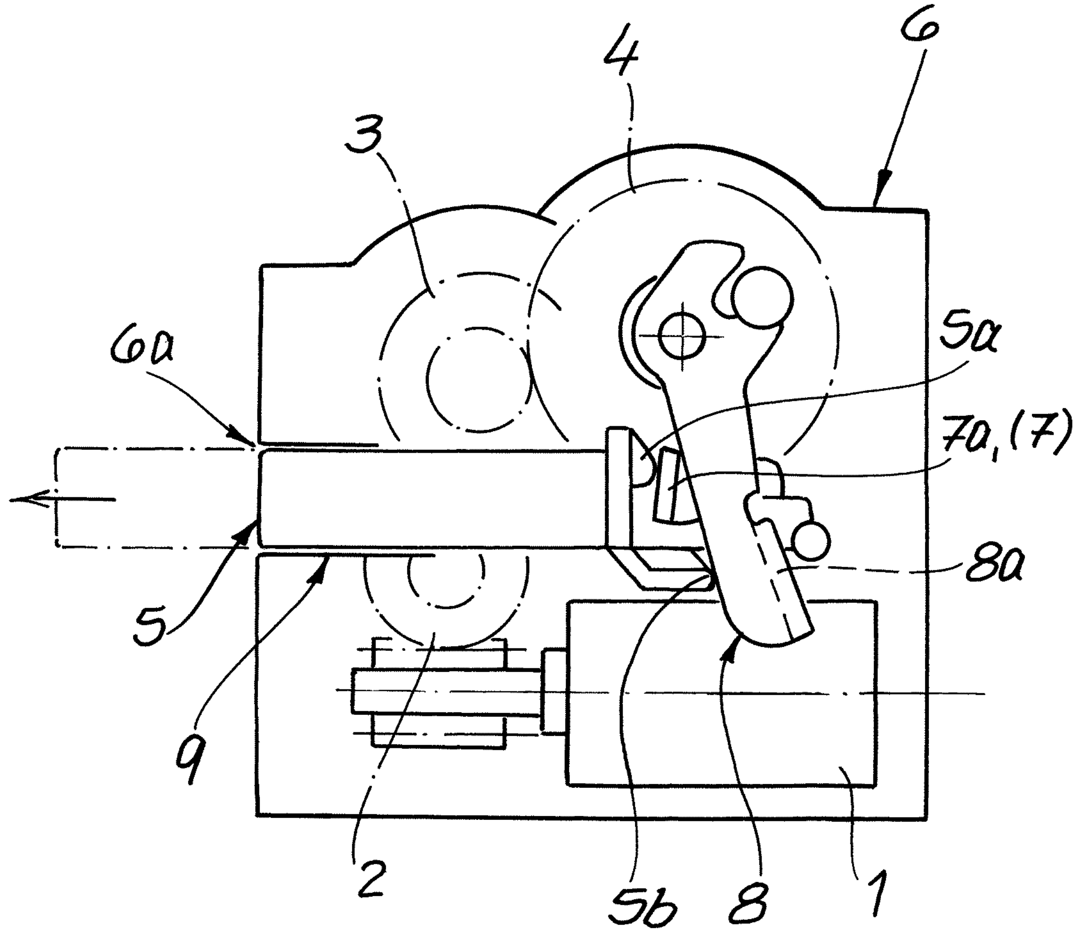
FIG. 2 shows the basic design of the lever gear mechanism.

For this purpose, the setting-open device is equipped with an electric-motor drive 1, 2, 3, 4 as shown in FIG. 2. In addition, an actuating element 5 is realized which actuates the door leaf (not shown in detail). The actuating element 5 here applies a travel-dependent force to the door leaf along the actuation travel S of said actuating element.

The actuation travel S can be understood through the two illustrations in FIG. 1. The upper part of FIG. 1 shows the actuating element 5 in a retracted end position, whereas the lower part of FIG. 1 shows the actuating element 5 in a different end position, namely in an exposed position with respect to a housing 6 enclosing the entire setting-open device. In fact, the housing 6 is completely closed and accommodates in its interior the electric-motor drive 1 to 4 as well as a lever gear mechanism 7, 8 described in more detail below. The enclosing housing 6 is designed to be closed except for a front opening 6*a* through which the actuating element 5 can be extended and retracted relative to the housing 6.

According to the invention, the electric-motor drive 1 to 4 acts on the actuating element 5 with the interposition of the lever gear mechanism 7, 8 already mentioned, as can be seen in the overview in FIG. 2. For this purpose, the lever gear 7, 8 acts on the actuating element 5 with at least a short lever 7 and a long lever 8. Based on the exemplary embodiment, it can be seen that the length of the short lever 7 corresponds to slightly more than half the length of the long lever 8, which of course is shown only by way of example.

In fact, the design is such that the short lever 7 acts on an end pin 5*a* of the actuating element 5, whereas the long lever 8 interacts with a cantilever 5*b* of the actuating element 5. The overall design is such that the two levers 7, 8 act on the actuating element 5 successively. In fact, according to the exemplary embodiment, the procedure is such that, starting from the first end position of the actuating element 5 shown in the upper part of FIG. 1 in its retracted state relative to the housing 6, first the short lever 7 acts on the actuating element 5 and then the actuating element 5 is acted on by the long lever 8.

For this purpose, both levers 7, 8 are connected on the same axle to a gear wheel 4 as part of the electric-motor drive 1 to 4.

In fact, the electric-motor drive 1 to 4 is made up of an electric motor 1 and a gear mechanism 2, 3, 4 acted on by the motor. The gear mechanism 2, 3, 4 ensures that high-speed rotary movements of an output shaft of the electric motor 1 are stepped down overall, i.e. ultimately result in a slow rotary movement of the output-side gear wheel 4.

As stated, the two levers 7, 8 are connected on the same axle to the output-side gear wheel 4 of the gear mechanism 2, 3, 4 of the electric-motor drive 1 to 4. According to the embodiment, the two levers 7, 8 have an angular distance a of approximately 20° to 40° from each other. This of course depends on the particular topological conditions and the design, and is by no means to be understood as mandatory or in any way restrictive.

In the exemplary embodiment, the actuating element 5 is a linearly movable actuating slide 5. In fact, for this purpose, the housing 6 is equipped on the inside with a linear guide 9, with the help of which the actuating element 5 or the linearly movable actuating slide 5 is guided inside the housing 6.

In general, two stop contours 5*a* and 5*b* provide the action on the actuating slide 5, as can be seen from the functional sequence in FIGS. 3A to 3C and 4A to 4C. The two stop contours 5*a*, 5*b* are spaced apart from each other along the longitudinal extension of the actuating slide 5. In addition, the design is such that the stop contour 5*a* interacts with the short lever 7, whereas the further stop contour of 5*b* is arranged and designed to interact with the long lever 8. For this purpose, the relevant lever 7, 8 has an associated stop edge 7*a* or 8*a*. The stop contour 5*a* is an end pin 5*a* on the actuating element 5. In contrast, the stop contour 5*b* is a cantilever 5*b*.

Figure 3:
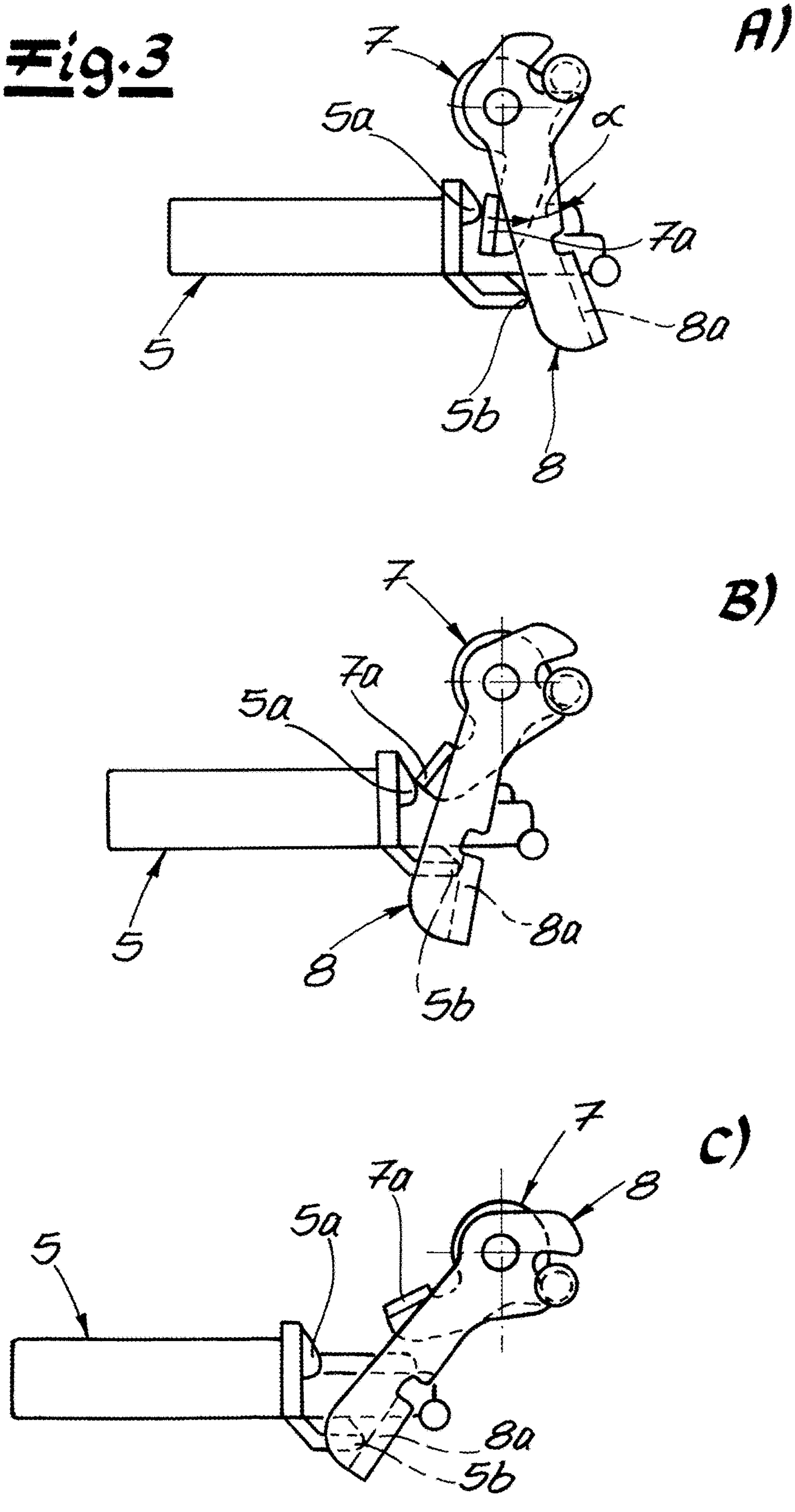
FIGS. 3A, 3B and 3C show the actuating element being acted on during its actuation travel in a first variant.
Figure 4:
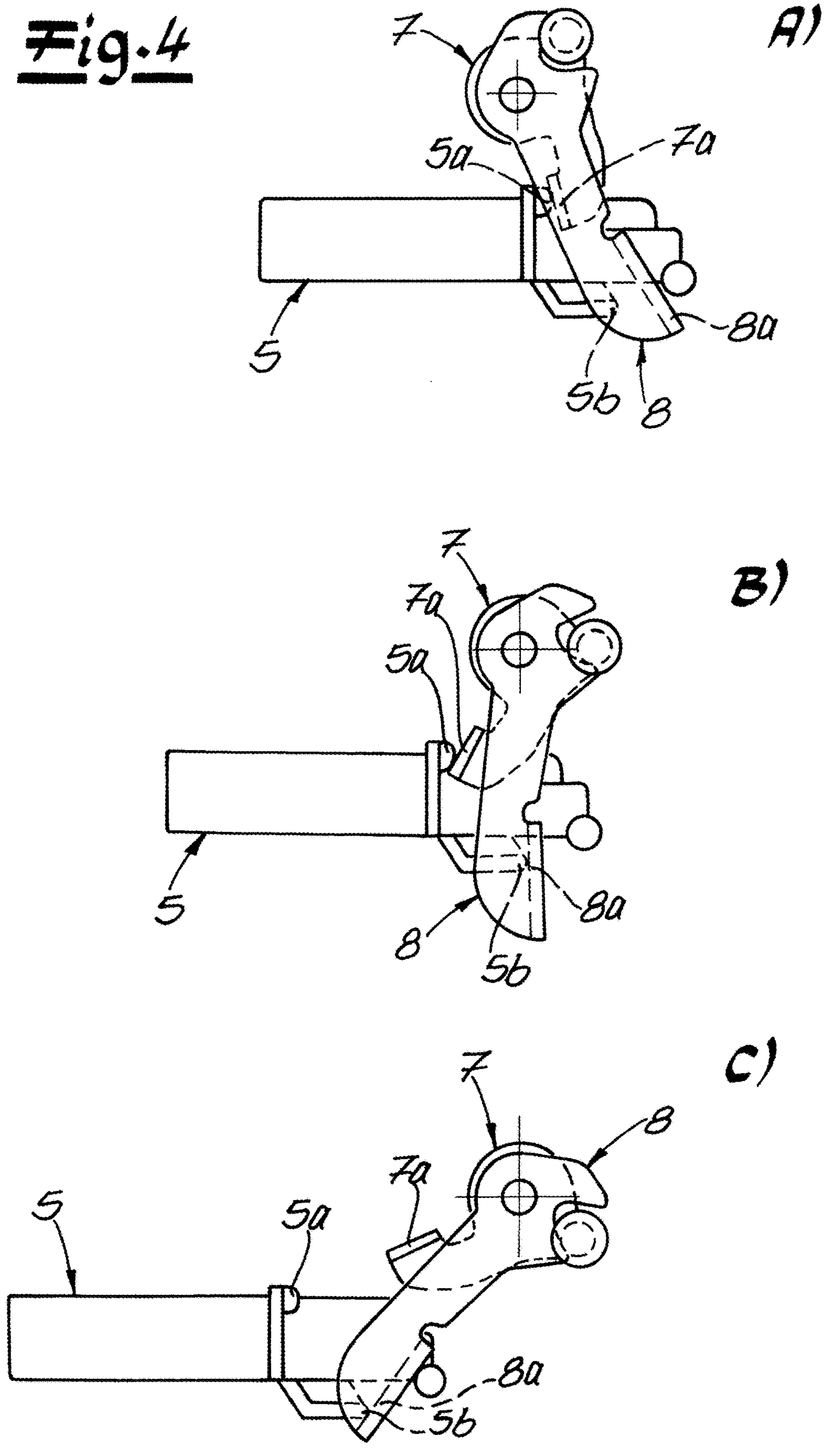
FIGS. 4A, 4B and 4C show a modified second embodiment.

The functioning can now be understood on the basis of the functional sequence in FIG. 3A to 3C and 4A to 4C. FIGS. 3A and 4A show the retracted state of the actuating element 5 corresponding to the upper illustration in FIG. 1, whereas FIGS. 3C and 4C show the fully extended position of the actuating element 5 after completing the actuation travel S, corresponding to the lower illustration in FIG. 1.

Starting from the end position according to FIG. 3A or 4A, the short lever 7 is initially in contact with the actuating slide 5. Because in this functional position according to FIG. 3A or 4A the short lever 7 etc. is located and then however a further change on page 11 line 9 it should say according to FIG. 3A or 4A the functional position corresponding representation in FIG. 3B or 4B can be understood. A gear ratio change now takes place in such a way that the short lever 7 moves out of engagement with the end pin or the stop contour 5*a*, so that the long lever 8 then comes into contact, with its stop edge 8*a*, with the cantilever 5*b* or the stop contour 5*b*.

During the transition from the functional position according to FIG. 3B or 4B to FIG. 3C or 4C, the actuating element 5 is now acted on with a lower force and a higher speed until it reaches its other end position and thus the exposed position corresponding to the lower illustration in FIG. 1. In doing so, the actuating slide 5 completes the remainder of the actuation travel S.

The invention claimed is:

1. A setting-open device for a motor vehicle door including a door leaf, the setting-open device comprising:

an electric-motor drive, a lever mechanism including a short lever and a long lever, and an actuating element, wherein the actuating element is configured to act on the door leaf, wherein the actuating element acts on the door leaf with a travel-dependent force along an actuation travel of the actuating element, wherein the electric-motor drive acts on the actuating element by interposition of the lever mechanism, wherein the lever mechanism acts on the actuating element by way of at least the short lever and the long lever, wherein the electric-motor drive includes an electric motor and a gear wheel rotated by the electric motor, wherein the gear wheel includes an axle, wherein the short lever and the long lever are mounted on the axle of the gear wheel of the electric-motor drive, and wherein the actuating element is designed as a one piece rigid linearly movable actuating slide, and the short lever and the long lever directly engage and act on the linearly movable actuating slide.

2. The setting-open device according to claim 1, wherein the actuating element includes an end pin, and wherein the short lever directly acts on the end pin of the actuating element.

3. The setting-open device according to claim 1, wherein the actuating element includes a cantilever, and wherein the long lever directly interacts with the cantilever of the actuating element.

4. The setting-open device according to claim 1, wherein the short lever and the long lever directly act on the actuating element successively.

5. The setting-open device according to claim 4, wherein starting from an end position, the actuating element is configured to be first directly acted on by the short lever and then by the long lever.

6. The setting-open device according to claim 1, wherein the short lever and the long lever form an angular distance, and wherein the angular distance is 20° to 40°.

7. The setting-open device according to claim 1, wherein the short lever includes a first stop edge and the long lever includes a second edge, and wherein the linearly movable actuating slide is equipped with a first stop contour configured to directly interact with the first stop edge and a second stop contour configured to directly interact with the second stop edge.

8. The setting-open device according to claim 7, wherein the first and second stop contours are spaced apart such that the first stop edge of the short lever directly acts on the first stop contour before the second stop edge of the long lever directly acts on the second stop contour.

9. The setting-open device according to claim 1, wherein the gear wheel is part of a reduction gear mechanism.

10. The setting-open device according to claim 1, wherein at least one of the actuating element, the short lever, and the long lever is plastic.

11. The setting-open device according to claim 1, further comprising a housing including a linear guide configured to support the linearly movable actuating slide.

12. The setting-open device according to claim 11, wherein the housing is sealed.

* * * * *